United States Patent [19]
Heller et al.

[11] 4,081,209
[45] Mar. 28, 1978

[54] HEADGEAR WITH SPHERICAL SEMI-REFLECTING SURFACE

[75] Inventors: Fritz Peter Heller, Bromley; Stafford Malcolm Ellis, Maidstone, both of England

[73] Assignee: Elliott Brothers (London) Limited, Chelmsford, England

[21] Appl. No.: 680,746

[22] Filed: Apr. 27, 1976

[30] Foreign Application Priority Data

Apr. 29, 1975 United Kingdom .............. 17812/75

[51] Int. Cl.² ............................................. G02B 27/14
[52] U.S. Cl. .................................... 350/174; 350/298
[58] Field of Search ............. 350/174, 170, 298, 296, 350/291, 287, 286

[56] References Cited

U.S. PATENT DOCUMENTS

Re. 28,847  6/1976  Vizenor ...................... 350/298
3,170,979   2/1965  Baldwin et al. .............. 350/174
3,940,204   2/1976  Withrington ................. 350/174

Primary Examiner—Jon W. Henry
Attorney, Agent, or Firm—Kirschstein, Kirschstein, Ottinger, Frank & Cobrin

[57] ABSTRACT

Headgear incorporating an optical display system comprising, an optical data source mounted within the headgear above the level of the wearer's eyes, an image combiner having a spherical reflecting surface directed inwardly of the helmet and intercepting the wearer's forward line-of-sight, and a prism positioned and dimensioned so that a collimated, aberration free virtual image of the data source is presented to the wearer as a result of reflection of rays transmitted from the data source by way of the prism to the spherical reflector. Such aberration as is introduced by the prism compensates for aberration introduced by the spherical reflector.

8 Claims, 4 Drawing Figures

HEADGEAR WITH SPHERICAL SEMI-REFLECTING SURFACE

This invention relates to headgear for an occupant of a vehicle, for example the pilot of an aircraft, incorporating an optical display system for superimposing optical data on a distant scene viewed by the wearer.

According to the present invention, headgear for the occupant of a vehicle, incorporates an image combiner part, supported by the headgear and comprising a semi-reflecting concave curved surface directed inwardly of the headgear, a substantially planar optical data source located at a position of the headgear such that, when the headgear is being worn, the said source is above the level of the wearer's eyes, and a prism also located at a position of the headgear above the level of the wearer's eyes, and in which, when the headgear is being worn, the image combiner part is at or is movable to a position at which it intercepts the forward line-of-sight of an eye of the wearer, and the prism has a shape and dimensions such, and the data source, the prism, and the combiner part are so positioned relatively to one another that a collimated virtual image of the data source is presented to the wearer as a result of transmission through the prism and reflection at said semi-reflecting surface, of rays from the data source.

Conveniently the image combiner part is integral with a transparent visor supported by the headgear, and may be movable to a position out of said forward line-to-sight. The prism may be operative to compensate for aberration of said rays from the data source introduced by said semi-reflecting surface.

In a preferred embodiment, the concave semi-reflecting surface is spherical, the interface of the prism through which said rays emerge from the prism on their path to the wearer's eye then conveniently being so disposed with respect to the concave spherical surface that refraction of the rays at the interface compensates for spherical aberration introduced by reflection at said spherical surface.

Preferably the headgear includes a refractive interface through which rays from the data source are transmitted on their path to the said eye of the wearer, this refractive interface being so inclined with respect to the plane of the data source as to compensate for distortion of the image of the data source due to variations in the optical path length of different rays therefrom.

The said refractive interface may comprise the interface of the prism through which said rays enter the prism on their path to said eye of the wearer.

The prism may conveniently be movable to an inoperative position in which it lies outside the field of view presented to the said eye of the wearer by reflection at said concave surface when the display system is not in use.

In a preferred embodiment of the invention the headgear comprises a protective helmet the data source then being mounted in a cavity formed in the body of the helmet and protected from the head of the wearer by a layer of impact absorbent material.

A protective helmet in accordance with the invention, for the pilot of an aircraft, will now be described, by way of example only, with reference to the accompanying drawings of which:

Figure 1:
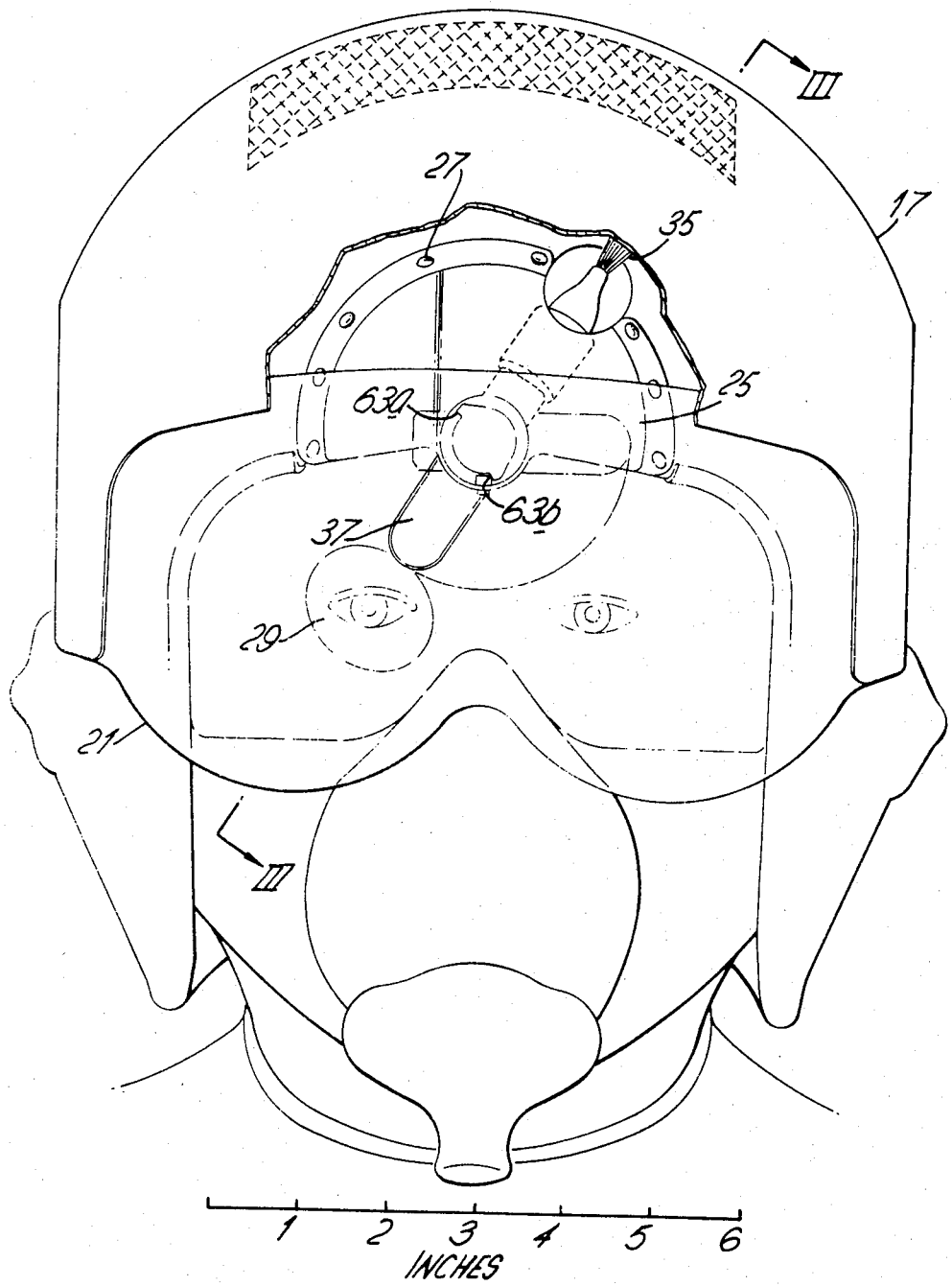
FIGS. 1 and 2 show, to the scale indicated in FIG. 1 front and side elevational views respectively of a pilot's protective helmet in accordance with the invention.
Figure 2:
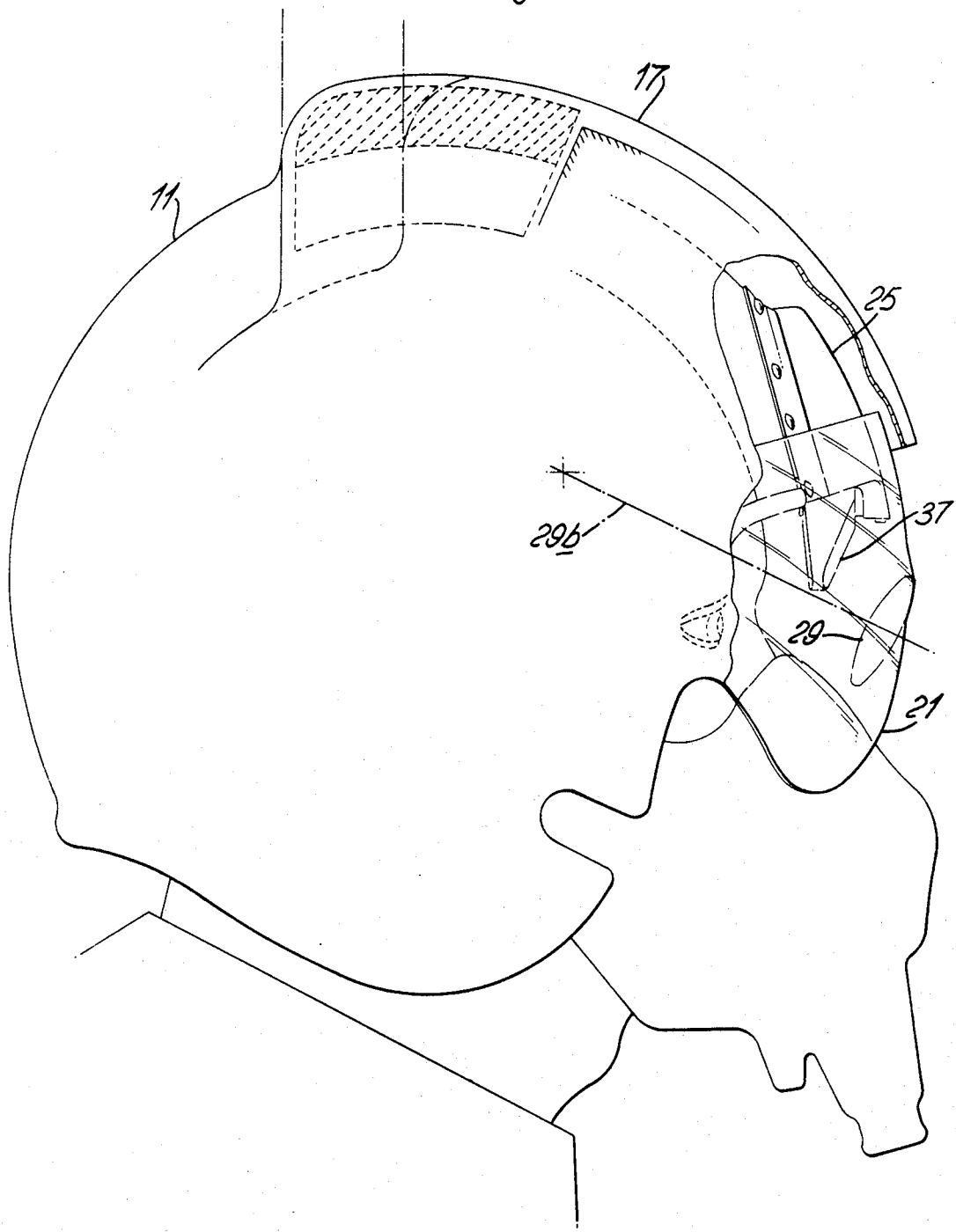
Figure 3:
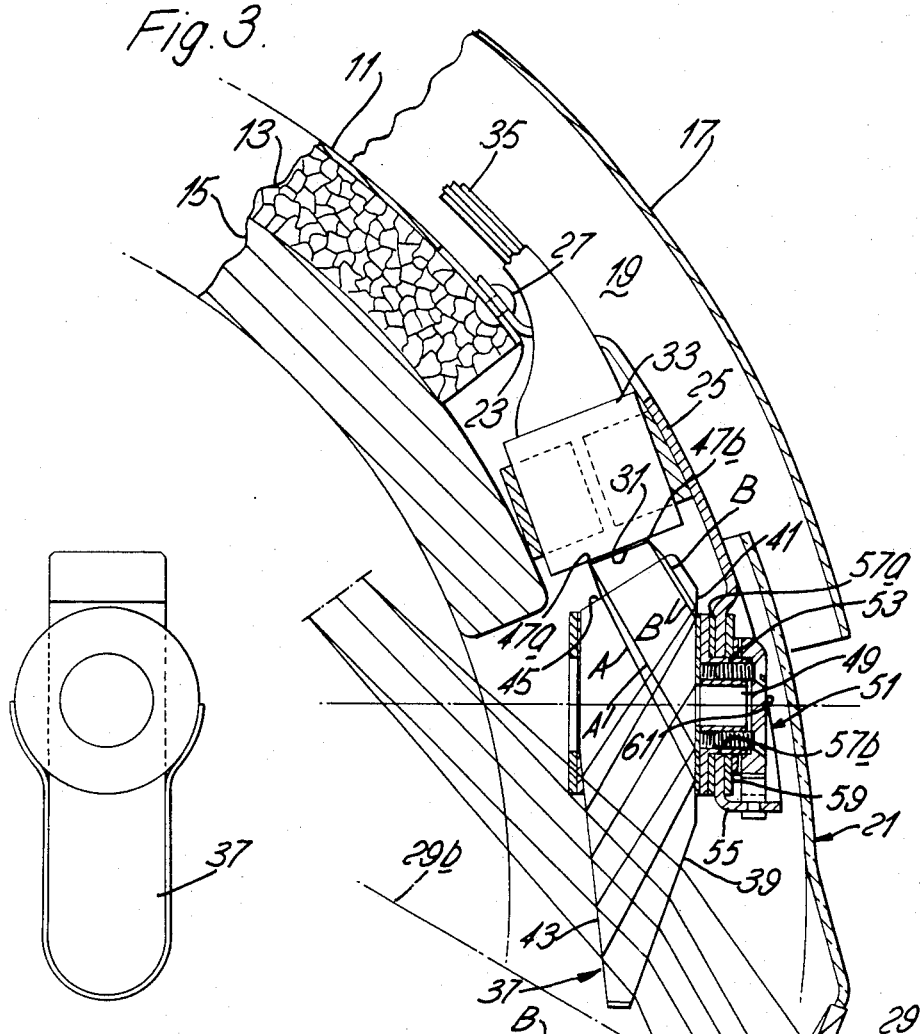
FIG. 3 shows, to twice the scale of FIGS. 1 and 2, a section taken on line III-III of FIG. 1; and, FIG. 4 is a diagram showing another view of a part represented in FIG. 3.
Figure 4:
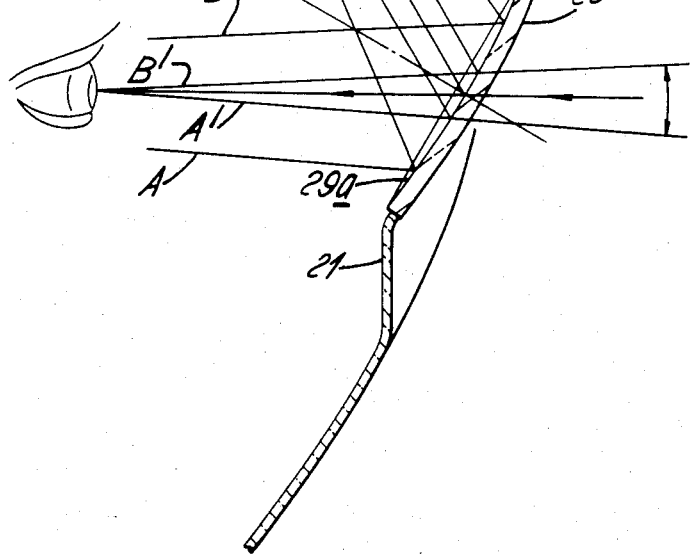

The protective helmet for the pilot of an aircraft is of known general construction. Between the outer plastic skin 11 of the helmet and the pilot's head there is a moulded layer 13 of expanded plastic material e.g. expanded polyurethane or expanded polystyrene, and a moulded layer 15 of rubber.

A moulded plastic skin 17 is secured to the skin 11 and is so shaped as, with the skin 11, to define a cavity 19 occupying the sincipital region of the helmet. A visor 21, in one of its extreme pivotal positions, is located substantially entirely within the cavity 19; at its other extreme pivotal position the visor is, as shown, before the pilot's eyes.

In the sincipital region of the helmet, the plastic skin 11 and the underlying expanded polyurethane or similar layer 13 have a generally semi-circular forward boundary 23. A formed steel sheet number 25 secured, as by rivets 27, around the skin 11 at its boundary 23 constitutes the support member for certain optical elements of the optical display system.

The visor 21 incorporates a semi-reflective image combiner part 29 of an optical display system. As represented the combiner part is a glass element let into an aperture formed in the visor during its moulding. The part 29 is so located as, when the visor is in its operative position (as shown), to intercept the pilot's forward line-of-sight.

The combiner part 29 has a concave spherical reflector surface 29a which is directed inwardly of the helmet; the principal axis 29b of the surface 29a is, as shown, inclined at an acute angle with respect to the forward line-of-sight of the pilot. Conveniently the visor 21 has, in the vicinity of the combiner part, a shape as indicated.

The optical data source 21 of the optical display system comprises a two-dimensional array of light-emissive diodes (LED's), supported on a face of a control box 33 which is itself secured to the support member 25 and houses LED addressing circuitry operable selectively to activate the several diodes of the array so as to form any one or more of a range of predetermined optical symbols which, it may be wished to present to the pilot for his instruction.

The addressing circuitry within the control box 33 is energizable by further electronic elements housed within the rearward part of the cavity 19 by way of electrical conductors 35 leading through an aperture in the support member 25.

As shown, the data source 31 and the control box 33 to which it is secured are within the cavity 19 formed between the member 25 and the protective rubber layer 15.

The virtual image of any optical symbol developed at the planar surface of the data source 31 must appear to be superimposed on the distant scene as viewed by the wearer of the helmet through the image combiner part 29, i.e. the wearer should be presented with a virtual image at infinity of the optical data source. For this purpose the optical data source 31 must lie in the principal focal plane of the optical display system so that light received therefrom as by the wearer's eye is collimated.

For practical reasons, the virtual image at infinity should be substantially free from distortion; it should, for all practical purposes, be not different in its proportions, from the display presented at the data source 31, and the optical display system must be compatible with the location of the source 31 at the position shown. The extremely limited space available and the minimisation of the risk of injury to the wearer dictates that the range of positions available for the source 31 and other parts of the optical system within the helmet are extremely limited. The configuration of elements shown in the figures approximates, quite closely, to what, it is believed, is the best packaging arrangement for the optical display system within such a helmet.

As shown, the plane of the optical data source is made the principal focal plane for the spherical reflector 29a by a prism 37. The manner in which the prism is supported with respect to the member 25 is discussed below.

So far as the optical properties of the prism 37 are concerned, attention is particularly directed to the glass-air interface 39, its distance from, and its angle of inclination with respect to the principle axis of the reflector surface 29a. This relationship is a particularly important one in the design of the system. With an optical system in which the virtual image of source 31 is viewed 'off-axis' through the combiner 29 the position of the above interface 39 can be chosen so that spherical aberration introduced by the prism 37 at the interface 39 substantially compensates for aberration introduced by the spherical reflector surface 29a.

The surfaces 41 and 43 of the prism 37 constitute internally reflective surfaces, folding the optical path so that the source 31 can be positioned as shown and, further, so as to enable the plane of the source 31 to be the principal focal plane for the spherical surface 29a. Rays from each point of the source 31 are able to enter the prism 37 through the surface 45. Two such points, 47a, 47b, are indicated; and from each point rays A, A' and B, B' are traced to the helmet wearer.

The plane of the data source 45 is inclined with respect to the interface 45 so as to compensate for distortion of the data source due to variations in the optical path between the wearer's eye and different points on the data source introduced by the prism 37.

It will be noted that the divergent rays e.g. A,A' and B,B' from each point are reflected by the spherical reflector surface 29a as parallel rays to the wearer. So, for a range of vertical relative positions between the observer's eye and the helmet, the virtual image of any display developed at the data source 31 appears undisturbed in relation to the distant scene as viewed through the combiner part 29. The helmet and the optical display system may, properly designed, accommodate, in particular, variations in the head dimensions of potential users of the helmet and also of relative movement, e.g. under acceleration, between the helmet and the head of its wearer.

The optical display system discussed so far is capable of dealing with spherical aberration and coma; it is not intended to deal with astigmatism in the system. Astigmatism may, however, be corrected by introducing into the optical system a cylindrical element; and this may be done at any one of several places. The interface 39 may have a cylindrical curvature in its transverse direction; or the reflective surfaces 41 or 43 may be so curved. Yet again, there may be a separate cylindrically curved optical element in the system. None of these possibilities is expressed in the drawing; in any event, the radius of cylindrical curvature would be very large, amounting to, perhaps, a radius of about 80 inches.

These, then, are the optical considerations typically to be borne in mind in arriving at a satisfactory optical display system in accordance with the invention. As a practical matter it is desirable that the prism 37 should be displaceable so as, when the sight is not in use, to occupy a retracted or parked position.

To this end the prism 37 is secured to the rotary part 49 of a journal bearing 51 the stationary part 53 of which extends through an aperture 55 in the member 25. Friction washers 57a and 57b are urged by a wavy washer 59 so as to hold the prism against rotation from the desired position. The friction level is nevertheless such that the prism 37 may be rotated from the operative position shown in the figures to the parked position indicated (FIG. 1) as a chain dotted line. A cap and screw connector 61 secure the prism support to the support member 25 of the helmet. The cap has two abutment portions 63a, 63b, which limit the rotation of the prism and, in particular, define the operative and parked positions for the prism.

It will be appreciated that modifications may be made to the optical display system without departing from the scope of the invention. Thus, although it is preferred for simplicity to employ only a single optical element, i.e. the prism 37, for reflectively directing optical data from the source onto the image combiner surface 29, and for providing compensation for aberration introduced by the surface 29, separate optical elements may be used for these purposes.

It should also be appreciated that the concave semi-reflecting surface of the combiner part 29 may be aspherical, e.g. paraboloidal, although it is generally preferred to use spherical surfaces since such surfaces are simpler to construct, and any optical aberrations introduced thereby can be more readily compensated as demonstrated by the simplicity of the system described.

Furthermore, although the data source 31 is shown in the form of an LED display, it may take any other suitable form, e.g. a cathode ray tube or electroluminescent display. Alternatively the data source may simply comprise a screen or the like, to which light signals, generated at a location remote therefrom, are transmitted for example, by optical fibres.

We claim:

1. Headgear for the occupant of a vehicle, incorporating an optical display system, comprising:
  (A) a member having a concave semi-reflecting curved surface directed inwardly of the headgear and which when the headgear is being worn is at or is movable to a position at which it intercepts the forward line-of-sight of an eye of the wearer; and
  (B) above the level of the wearer's eyes, an optical projector by means of which luminous data is directed at the aforesaid semi-reflecting surface for reflection thereby to the wearer's eye so that the wearer is presented with a virtual image of the aforesaid luminous data within a predetermined field of view centered on the wearer's forward line of sight; characterized in that the concave semi-reflecting surface is spherical; and
  (C) the optical projector is secured to the headgear and comprises an extended substantially planar optical data source, and a prism whose shape, dimensions and position are such that rays from all points of the extended planar data source enter the prism at one face thereof, are reflected in the prism downwards to a generally downward and forward facing exit face of the prism, are refracted at the latter face and are then incident on the spherical semi-reflecting surface; and (D) further characterized in that the inclination of the exit face of the prism with respect to the spherical semi-reflecting surface is so chosen that aberration introduced by the prism by virtue of the aforesaid inclination of the exit face is effective to compensate substantially wholly for the aberration introduced by the spherical semi-reflecting surface as a result of the off-axis configuration of the system.

2. Headgear according to claim 1, wherein the said member having a concave semi-reflecting surface is integral with a transparent visor supported by the headgear.

3. Headgear according to claim 1, wherein the said member having a concave semi-reflecting surface is movable to a position out of said forward line-of-sight.

4. Headgear according to claim 1, wherein the interface of the prism through which said rays emerge from the prism on their path to the wearer's eye is so disposed with respect to the spherical semi-reflecting surface that refraction of the rays at the interface compensates for spherical aberration introduced by reflection at said spherical surface.

5. Headgear according to claim 1, including a refractive interface through which rays from the data source are transmitted on their path to the said eye of the wearer, said refractive interface being so inclined with respect to the plane of the data source as to compensate for distortion of the image of the data source due to variations in the optical path length of different rays therefrom.

6. Headgear according to claim 5, wherein said refractive interface comprises the interface of the prism through which said rays enter the prism on their path to said eye of the wearer.

7. Headgear according to claim 1, wherein the prism is movable to an inoperative position in which it lies outside the field of view presented to the said eye of the wearer by reflection at said spherical surface.

8. A protective helmet according to claim 1, wherein the data source is mounted in a cavity formed in the body of the helmet and is protected from the head of the wearer by a layer of impact absorbent material.

* * * * *